United States Patent [19]

Sutherland et al.

[11] 4,422,325

[45] Dec. 27, 1983

[54] DUAL PURPOSE WATER METER COVER

[75] Inventors: Ray Sutherland, Hopewood; Mark S. Wood, Lemont Furnace, both of Pa.

[73] Assignee: Rockwell International Corporation, Pittsburgh, Pa.

[21] Appl. No.: 351,828

[22] Filed: Feb. 24, 1982

[51] Int. Cl.³ ............................................ G01F 15/14
[52] U.S. Cl. ..................................................... 73/273
[58] Field of Search .................... 73/201, 272 R, 273, 73/274, 431, 257, 258

[56] References Cited

U.S. PATENT DOCUMENTS

| | | | |
|---|---|---|---|
| 3,308,664 | 3/1967 | Kullmann | 73/258 X |
| 3,435,679 | 4/1969 | Davis | 73/258 |
| 3,440,879 | 4/1969 | Frayssinoux | 73/257 X |

*Primary Examiner*—Charles A. Ruehl

[57] ABSTRACT

A water meter has a register cover which performs the dual function of covering the register as well as providing a tool to enable disassembly of the meter.

9 Claims, 10 Drawing Figures

DUAL PURPOSE WATER METER COVER

BACKGROUND OF THE INVENTION

1. Field of the Invention

This invention relates to water meters and is particularly directed to water meters which may be easily disassembled in the field without the necessity of resorting to separate or special purpose tools.

2. Description of the Prior Art

Conventional water meters typically are comprised of a main case which encloses a compartment into which a measuring chamber is received through a suitable opening in the main case. A closure member is provided to close the opening in the main case and retain the measuring chamber in the compartment. A register mechanism is also provided to indicate the volummetric flow through the meter and usually a cover will also be provided which is movable to a position to cover the index of the register and to a position where the index of the register is exposed for reading. Typical of the prior art are the meters shown in U.S. Pat. No. 2,246,250 to Hanks; No. 2,857,763; to Hague et al; No. 3,363,465; to Last; No. 3,662,600; and to Rosano, Jr. Each of these prior art patents show a main case within which is received a measuring chamber through an opening in the main case. A cover or closure member is provided to sealingly close the opening through which the measuring chamber is inserted into the main case. In the case of Hanks U.S. Pat. No. 2,246,250, the closure member 16 is retained in place by a ring of solder or rubber lodged in a groove provided in the main case. In the Hague et al patent the bottom plate 40 is held in position by bolts 48. In Last, the bottom body cover 62 is retained in position by means of a retainer ring 68 and in Rosano, Jr. the bottom plate 20 is threaded into the main case and apparently recesses are provided for a special spanner wrench to enable threaded withdrawal of the bottom cover from the main case. In each case a separate or special tool is required to remove the closure member in order to gain access to the interior of the meter. All of the meters show registers, the face of which is normally covered by a movable cover plate swingable between a position to cover the register or expose it for reading purposes.

SUMMARY OF THE INVENTION

In order to facilitate easy disassembly of the meter in the field without the necessity of resorting to separate or special purpose tools, Applicants have conceived an arrangement where the cover may be used in the manner of a spanner wrench to disassemble the meter. In Applicants' meter, the hollow main case encloses a measuring chamber and has an opening through which the measuring chamber is inserted into the interior of the main case. A closure member or a pressure plate closes the opening and is sealed with respect to the interior side walls of the main case. The pressure plate or closure member is retained in its position by a retainer ring which is threadedly received onto the main case above the closure member and which clamps the closure member into engagement with a shoulder or stop surface within the main case. The cover of Applicants' meter is removably hinged to a mounting or clamping ring on the main case and may be swung between a position to cover the meter register or to expose it for reading. Diametrically opposed projections are formed on the skirt of the cover which correspond to and are adapted to be received in corresponding spaced recesses in the retainer ring. When the cover is in closed position to cover the register index these projections in the cover are received in correspondingly positioned openings or recesses in the clamping ring to insure full sealing contact between the closed cover and the clamping ring.

Whenever it is desired to disassemble the meter in the field, the hinge bolt by which the cover is hinged to the clamping ring is removed and the cover and the ring are removed from the meter thereby exposing the retainer ring. The projections on the cover are then placed in the corresponding recesses in the retainer ring whereby the cover may then be used as a wrench to unscrew the retainer ring from the main case thus permitting removal of the pressure plate (closure member), strainer and measuring chamber. To reassemble the meter in the field the reverse process is followed. Applicants have therefore provided a dual function water meter cover which performs its normal function of covering the register mechanism but also functions as wrench to facilitate disassembly of the meter in the field.

DESCRIPTION OF THE PREFERRED EMBODIMENT

Figure 1:
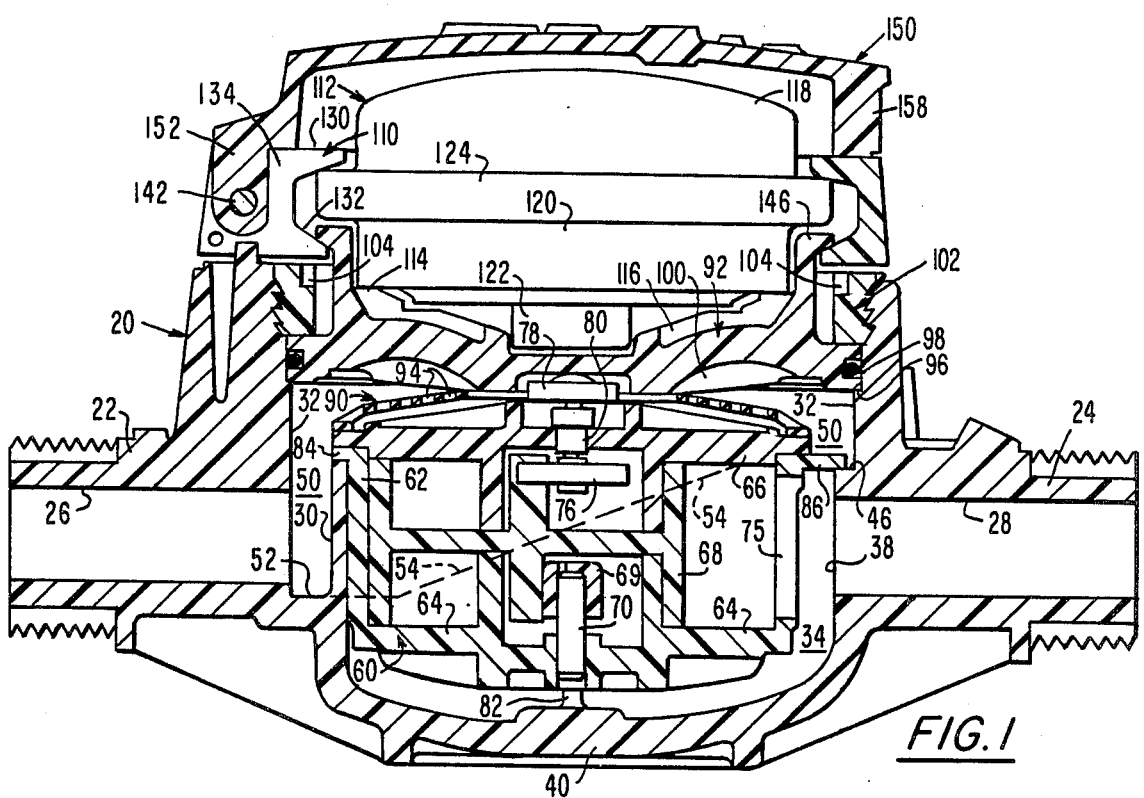
FIG. 1 is a vertical sectional view of a meter employing the instant invention.
Figure 2:
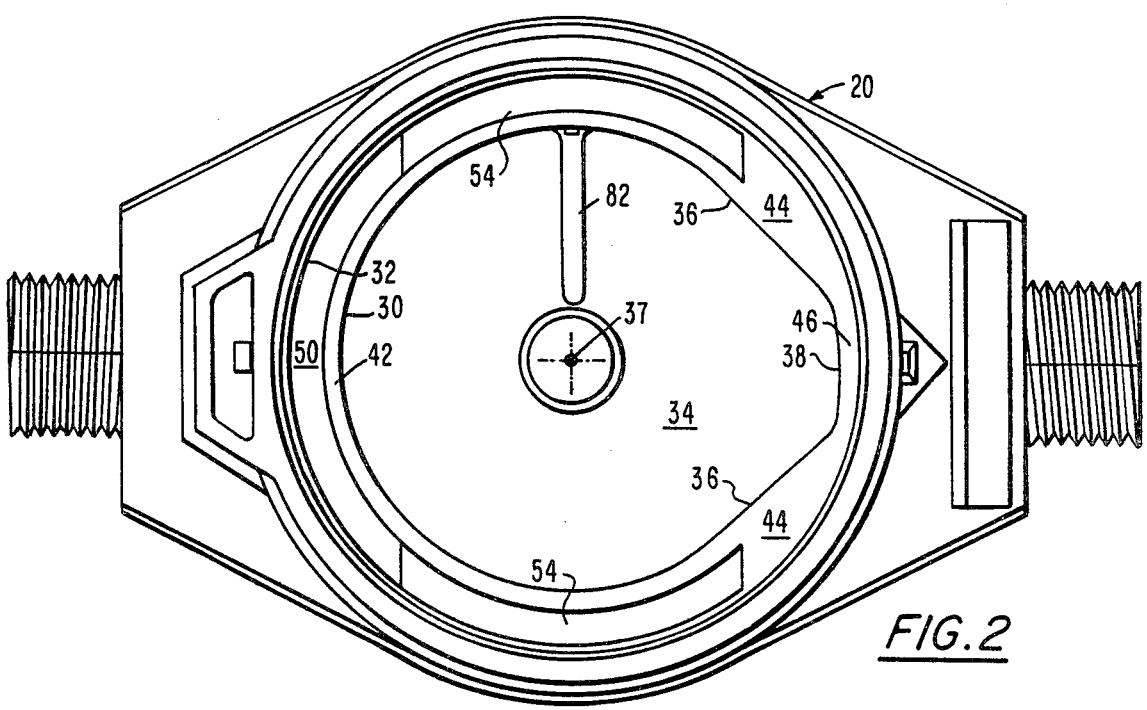
FIG. 2 is a top plan view of the meter main case with the measuring chamber, pressure plate, retainer ring, clamping ring and cover removed to expose the various chambers and seating surfaces within the main case.
Figure 3:
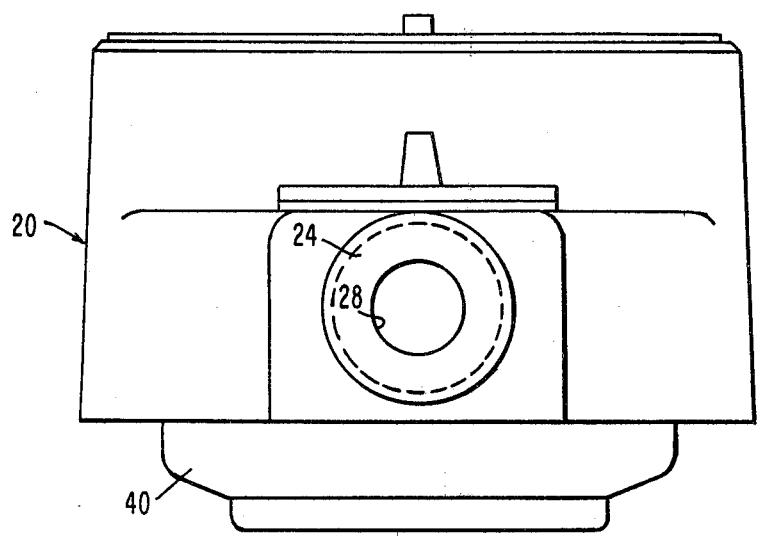
FIG. 3 is a side view from the right in FIG. 1 showing the exterior of the main case.

Referring particularly to FIGS. 1 and 2, the meter is comprised of a generally hollow main case 20, the interior of which opens upwardly and has a closed bottom wall 40. Inlet and outlet spuds 22 and 24, respectively, are formed on opposite sides of the main case with inlet passage 26 and outlet passage 28 formed in spuds 22 and 24, respectively, and which communicate with the interior of the main case 20. A measuring chamber compartment 34 is defined by interior side wall portions 30, 36, 38 and bottom wall 40 of the main case. Wall portion 30 is circular in form and concentric with interior wall 32 of the main case. At the outlet end of compartment 34, wall portion 38 is formed on the interior of the main case at a distance from the center or axis 37 of the main case somewhat greater than the radius of circular wall portion 30. Wall portions 36, also formed on the interior of the main case, are substantially straight, as viewed in FIG. 2, and serve to connect circular wall portion 30 with wall portion 38. Co-planar seating surfaces 42, 44 and 46 are formed respectively on the tops of wall portions 30, 36 and 38. Thus, a continuous seating surface is formed comprised of the surfaces 42, 44 and 46.

An inlet chamber 50 which is in communication with inlet passage 26 is defined between walls 30, 32, bottom wall 52 and inclined ramps 54, shown in dotted lines in FIG. 1, which merge at one end with bottom wall 52 of the inlet chamber 50 and at the other end with seating surfaces 44.

Figure 7:
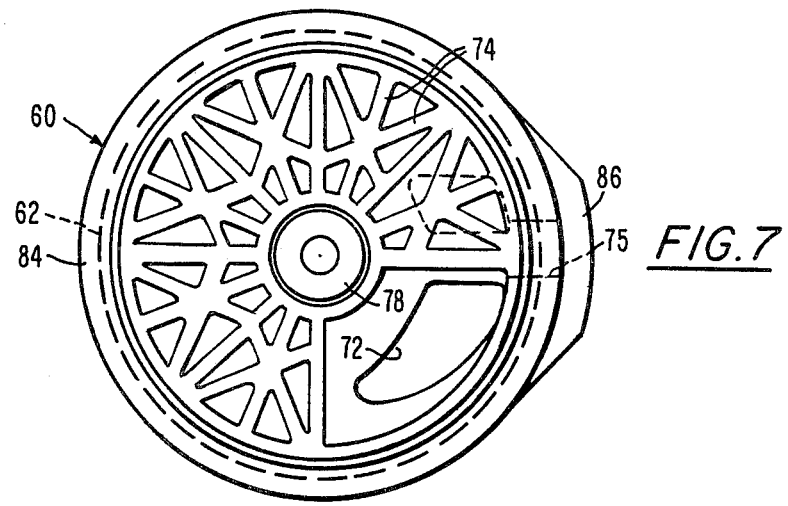
FIG. 7 is a top plan view of the measuring chamber shown in section in FIG. 1.

A measuring chamber identified generally by the numeral 60 (FIGS. 1 and 7) is received within compartment 34 and is comprised of a circular side wall 62, a bottom wall 64 and a top wall 66. An oscillating piston 68 within the measuring chamber 60 is guided for oscillating movement within the measuring chamber about a bushing 69 on guide pin 70 projecting upwardly from bottom wall 64. An inlet 72 is formed in the top wall 66 as best shown in FIG. 7. The top wall 66 is provided with a lattice-work of strengthening ribs, two of which are denoted by the numeral 74 in FIG. 7. An outlet 75 is formed in the vertical wall 62 adjacent outlet passage 28 in spud 24 as best shown in FIG. 1. A locating rib 82 projecting upwardly from the interior surface of bottom wall 40 projects into a complementary recess formed in the bottom of the measuring chamber to insure proper positioning of the measuring chamber within the main case during assembly.

In operation, fluid enters the measuring chamber through inlet 72 and leaves the measuring chamber through outlet 75. If desired, a further outlet (not shown) may be provided in the bottom wall 64 to enhance flow through and minimize pressure drop across the measuring chamber. The flow of water through the measuring chamber causes the piston 68 to oscillate in a manner well known to those familiar with this art and in a manner similar to that described in U.S. Pat. No. 2,857,763. The oscillations of the piston 68 rotate a crank 76 journalled for rotation within the measuring chamber which, in turn, rotates a driving magnet 78 by means of a sealed drive indicated generally by the numeral 80.

A circumferential lip 84 is formed around the top of the vertical wall 62 of the measuring chamber and has a projecting portion 86 formed near the inlet and outlet portion of the measuring chamber. The bottom surfaces of the lip 84 and the projection 86 are coplanar and form a continuous seating surface which seats on the seating surfaces formed by the upwardly facing seating surfaces 42, 44 and 46 on walls 30, 36 and 38. Thus, when the bottom surfaces on lip 84 and projection 86 are firmly seated on surfaces 42, 44 and 46, the inlet chamber 50 is sealed from the measuring chamber compartment 34 which may be considered an outlet chamber since it communicates directly with outlet passage 28. It will be noted that because of the projection 86 which extends over and seats on seating surfaces 44 and 46 there are no undercuts formed in the main case 20 so that the molds for producing the main case 20 are rendered relatively uncomplicated. In other words, if the circular wall 30 were extended completely around the interior of the meter and the seating surface 42 constituted a completed circle around axis 37, as is conventional in the prior art, either the space between the circular wall adjacent the outlet would have to be filled with the material of the main case 20, thus requiring a greater amount of material, or a seating surface would have to be formed which projects from the interior wall 32 near the outlet in order to form a continuous seating surface. Such a projection would require an undercut in the interior of the main case which would necessitate a more expensive mold and molding procedure.

Figure 5:
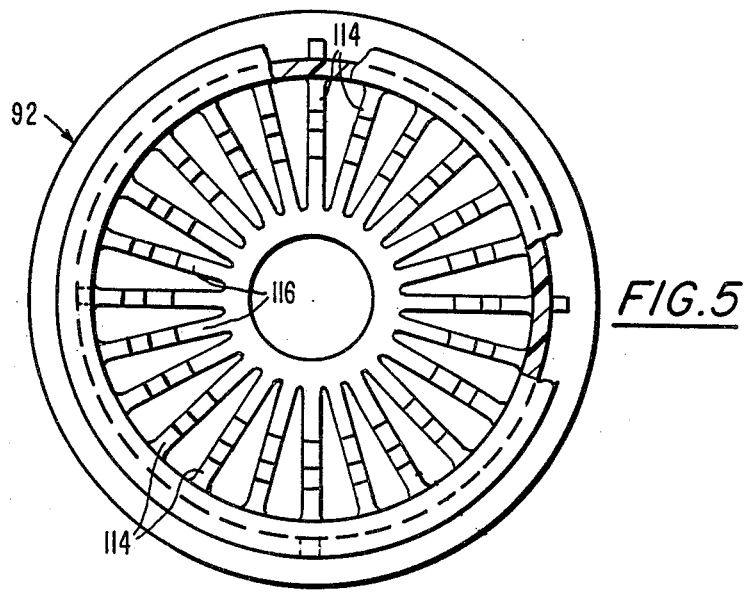
FIG. 5 is a top plan view of the pressure plate shown in section in FIG. 1.
Figure 6:
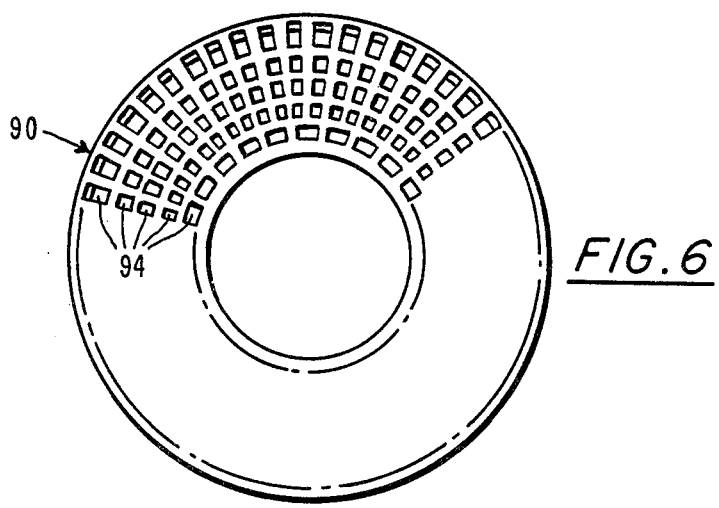
FIG. 6 is a top plan view of the strainer shown in section in FIG. 1.

The concave-convex dish shaped strainer 90 is interposed between a pressure plate 92 and the top wall 66 of the measuring chamber. Strainer 90 is preferably made of Acetal material and, as best shown in FIG. 6, has a multiplicity of perforations 94 approximately a third of which are shown in FIG. 6. A circular pressure plate 92, a plan view of which is shown in FIG. 5, is seated on a shoulder 96 formed on the interior of the main case 20. A conventional "O" ring seal 98 around the periphery of the pressure plate seals the chamber 50 against the leakage of fluid past pressure plate 92. A series of radially extending ribs 100 is formed in the bottom of the pressure plate and a series of similar radially extending ribs 116 are formed on the top of the pressure plate and enable it to withstand the fluid pressure within chamber 50. Co-planar surfaces 114 on ribs 116 provide an interrupted plane on which the bottom of register 112 is seated.

Figure 9:
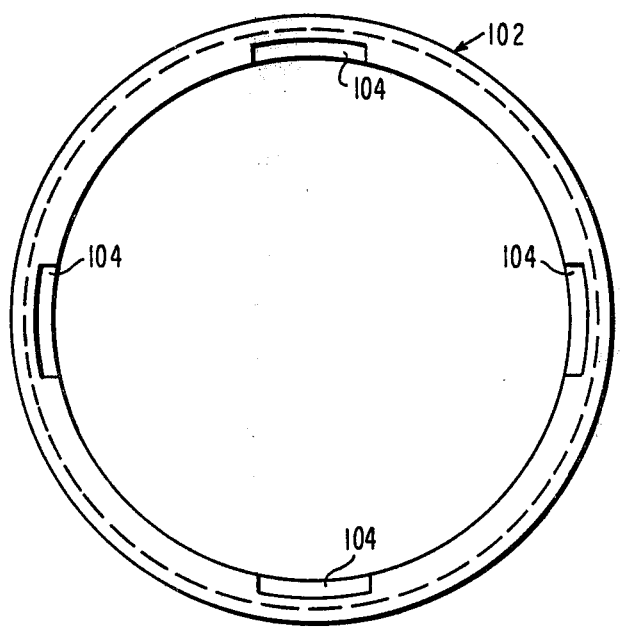
FIG. 9 is a top plan view of the retaining ring shown in section in FIG. 1.

A retainer ring 102, a top plan view of which is shown in FIG. 9, is externally threaded and adapted to be threadedly received into the top portion of the interior of main case 20 as shown in FIG. 1. As shown in FIGS. 1 and 9, the retainer ring 102 is provided with circumferentially spaced upwardly opening recesses 104 for a purpose which will be described below. When the retainer ring is threaded into the interior of the main case, the pressure plate 92 is held against shoulder 96. In this position the central portion of the strainer 90 which, as described above, is made of resilient Acetal material is deflected downwardly a sufficient amount so that the periphery of the strainer 90, which bears against the top wall of the measuring chamber, forces the downwardly facing co-planar surfaces of the lip 84 and projection 86 into sealing engagement with seating surfaces 42, 44 and 46 formed respectively on walls 30, 36 and 38. It can be seen that as the water flows through the inlet 26 and into the chamber 50 it passes through the openings 94 in the screen 90 into inlet 72 of the measuring chamber. Thus, the screen 90 performs the dual function of filtering or screening out foreign matter from the water to prevent their passage into the measuring chamber as well as providing a bias or seating force for the seating surfaces on the measuring chamber and the walls of the measuring chamber compartment. Because of the resiliency of the material from which the strainer is made and its dish-like configuration with the thrust of the pressure plate being applied to the central portion of the strainer and transferred to the measuring chamber at the peripheral portion of the strainer, the central portion of the strainer may be flexed or displaced a considerable distance without any significant variation in the thrust in the measuring chamber. Thus considerable variations in the position of shoulder 96 and the vertical position of the top peripheral surface of the measuring chamber will not result in excessive or inadequate seating pressure on the measuring chamber.

Figure 8:
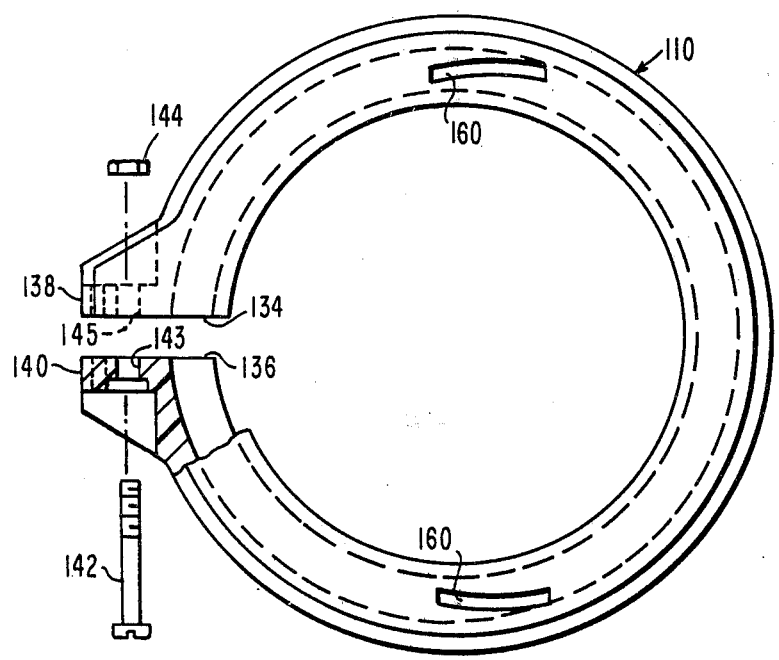
FIG. 8 is a top plan view of the clamping ring shown in section in FIG. 1.

Refering again to FIG. 1 a clamping ring 110, a plan view of which is shown in FIG. 8 serves to clamp a register mechanism identified generally by the numeral 112 in the assembly against an interrupted annular plane formed by co-planar surfaces 114 on radially extending strengthening ribs 116 as best shown in FIG. 5. The upper portion 118 of the register 112 is made of some suitable transparent material such as lucite to facilitate reading of the indicator contained within said upper portion, and a lower portion 120 which includes a depending well portion 122 may be formed of a metallic material. The upper portion 118 and lower portion 120 are joined by rolling a peripheral portion of the lower portion 120 over a lip formed in the upper portion 118 to produce a circumferential rim 124.

As shown in FIG. 1, ring 110 has two annular inwardly extending legs 130 and 132. As best shown in FIG. 8, clamping ring 110 is not a complete circle but has free end portions 134 and 136, at which ears 138 and 140 are formed. Aligned openings 143 and 145 are provided respectively in ears 140 and 138 to receive a bolt 142 on which nut 144 is threaded when the ring is assembled onto the meter. Since the clamping ring 110 is made of relatively flexible plastic material, to assemble it onto the meter, the ring is flexed to displace the ends 134 and 136 further apart than shown in FIG. 8, sufficiently to mount the ring on the upper portion of pressure plate 92 whereby the annular legs 130 and 132 will embrace the rim 124 on the register and rim 146 on the pressure plate. The leg 130 of the ring will then circumscribe the upper portion of the rim 124 and the lower leg 132 will circumscribe the rim 146 on pressure plate 92. When the screw 142 is inserted into aligned openings 143 and 145 and the nut 144 threaded down, end portions 134 and 136 of the ring will be brought closer together and since the lower surface of leg 130 and the upper surface of leg 132 are inclined, as the diameter of the ring is in effect reduced the bottom portion 120 of the register mechanism will be clamped against the interrupted plane comprised of the surfaces 114 on ribs 116.

A cup-shaped cover 150 is mounted on ring 110 by means of a hinge portion 152 (see 4A and 4B) which projects between the end portions 134 and 136 and which has an opening 154 to receive the shank of bolt 142. As described above as the nut 144 is threaded down on the screw the end portions of the ring 110 are drawn together to clamp the register mechanism 112 against the pressure plate; however, the separation between the end portions 134 and 136 is such that even when the register is firmly clamped against the pressure plate the hinging movement of the cover 150 is not inhibited.

Figure 4A:
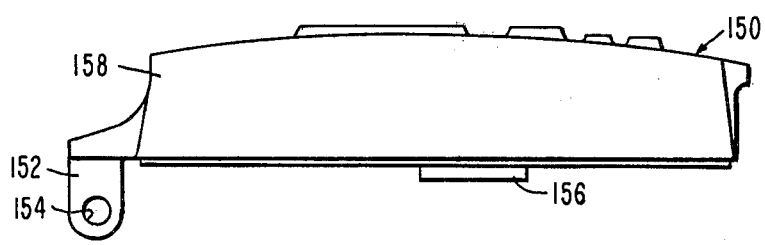
FIG. 4A is a front elevational view of the cover which is shown in section in FIG. 1.
Figure 4B:
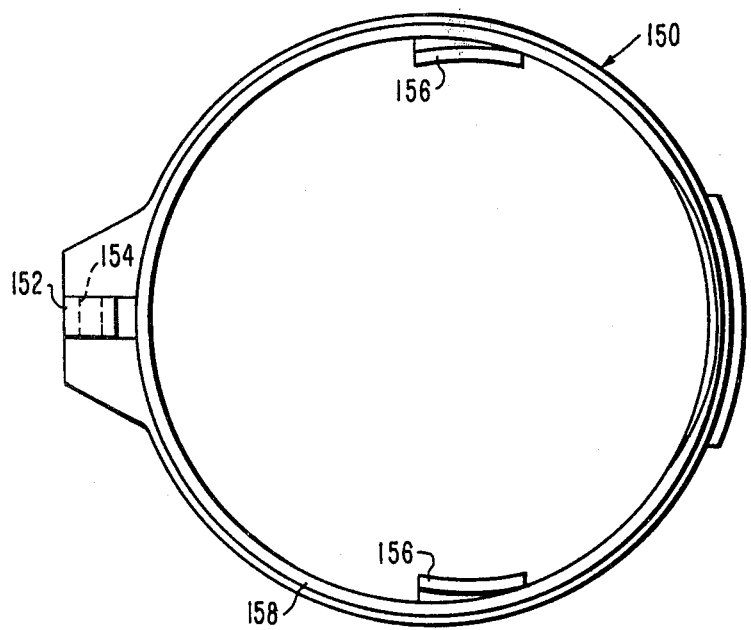
FIG. 4B is a bottom plan view of the cover shown in FIG. 4A.

As shown in FIGS. 4A and 4B, the cover 150 has diametrically spaced projections or dogs 156 projecting downwardly from the peripheral skirt portion 158, which are integrally formed on the interior of the skirt portion or otherwise fixed thereto. When the cover 150 is in its closed position as shown in FIG. 1, the dogs 156 are received in complementarily formed openings 160 in the ring 110 to thereby allow the cover 150 to be firmly and solidly seated on the ring. The spacing of the dogs 156 is such that they will also fit into diametrically opposed recesses 104 in the retaining ring 102.

Frequently meters which have been installed in the field for some time must be partially or completely disassembled to replace a defective or malfunctioning part such as the oscillating piston, the measuring chamber, the strainer, or the pressure plate 92 or its seal. In order to gain access to or replace the pressure plate 92, strainer 90, the measuring chamber 60 or the oscillating piston 68, all that is necessary is to remove the clamping ring 110 and cover 150 and disengage the cover from the clamping ring. The dogs or projections 156 are then inserted into diametrically opposed recesses 104 in the retainer ring. The cover and retainer ring may then be manually rotated to remove the retainer ring from the threaded portion of the main case 20. By providing what amounts to a spanner wrench on the cover 150, easy disassembly of the meter in the field is facilitated without the necessity of having access to a separate or special tool.

Thus the Applicants have provided a novel and useful arrangement for a water meter having a register cover which also serves as a tool for gaining access to the interior of the meter.

The invention herein described may be embodied in other specific form without departing from the essential characteristics thereof. The present embodiments therefore are to be considered as illustrative, the scope of the invention being indicated by the appended claims. All departures from the foregoing description which come within the meaning and range of equivalency of the claims are therefore intended to be embraced herein.

We claim:

1. A water meter comprised of a generally hollow main case having an opening, a closure member for closing said opening, securing means associated with said closure member and engaging said main case for releasably retaining said closure member in said opening, a register cover removably mounted on said meter, means on said cover for disengaging said securing means from said main case.

2. The meter defined in claim 1 in which said securing means is a retainer member threadedly engaging said main case.

3. The meter defined in claim 2 together with cooperating means on said retainer member which cooperate with said means on said cover to enable disengagement of said securing means from said main case.

4. The meter defined in claim 3 in which said cooperating means is composed of recesses formed in said retainer member and said means on said cover are projections adapted to be received in said recesses.

5. A fluid meter comprised of a generally hollow main case having an opening, a closure member sealingly closing said opening, a retainer member removably secured to said main case for retaining said closure member in said opening, a register cover removably secured to said meter, and cooperating means on said cover and said retainer member engageable with each other to enable removal of said retainer member from said main case.

6. The meter defined in claim 5 in which said cooperating means are projecting means on said cover and recess means on said retainer member for receiving said projecting means.

7. A fluid meter comprised of a generally hollow main case having an opening, a closure member sealingly closing said opening, a retainer ring threadedly received on said main case for retaining said closure member in said opening, a register mechanism, a mounting ring on said meter for securing said register mechanism on said meter, a cover removably mounted on said mounting ring and selectively movable to positions to cover or expose said register mechanism, cooperating means on said cover and said retainer ring engageable with each other to facilitate removal of said retainer ring from said main case.

8. The meter defined in claim 7 in which said cooperating means are projecting means on said cover and recess means on said retainer ring for receiving said projecting means when said cover is removed from said meter.

9. The meter defined in claim 8 together with recess means formed on said mounting ring into which said projecting means are received when said cover is in position to cover said register.

* * * * *